United States Patent [19]

Rocha

[11] 3,953,688
[45] Apr. 27, 1976

[54] CORD REEL AND WRITING PAD ATTACHMENT FOR TELEPHONES

[76] Inventor: Dominica R. Rocha, 8862 Cadallic Ave., Los Angeles, Calif. 90064

[22] Filed: Dec. 9, 1974

[21] Appl. No.: 530,510

[52] U.S. Cl.................................. 179/147; 179/178
[51] Int. Cl.².................................................. H04M 1/21
[58] Field of Search ........... 179/147, 178, 154, 155, 179/100 R, 100 C, 100 D; 40/336, 10 R; 281/15 B

[56] References Cited
UNITED STATES PATENTS

| | | | |
|---|---|---|---|
| 2,610,867 | 9/1952 | Hamilton | 179/147 |
| 2,667,367 | 1/1954 | Lapinski et al. | 179/147 |
| 2,678,779 | 5/1954 | Bellmer | 179/155 |

*Primary Examiner*—Thomas A. Robinson
*Attorney, Agent, or Firm*—Roger A. Marrs

[57] ABSTRACT

An attachment or accessory for a telephone is disclosed herein for automatically reeling the cord to maintain its length short and for providing a writing pad including backing surface and pencil holder. The attachment includes a snap-lock fastener for detachably connecting the attachment to the housing of the telephone. The device further includes a resilient element for biasing the cord so as to take-up its length about a spool or reel operably mounted on a case or housing. A roll of writing paper is disposed beneath the writing surface and feeds through a slot for use across the writing surface. The pencil or pen holder is a part of the snap-lock fastener.

5 Claims, 4 Drawing Figures

CORD REEL AND WRITING PAD ATTACHMENT FOR TELEPHONES

BACKGROUND OF THE INVENTION

1. Field of the Invention

This invention relates to telephone accessory devices and more particularly to novel attachment device for automatically coiling the length of telephone cord and for providing a writing paper dispenser as well as a pen holder.

2. Description of the Prior Art

In the past, it has been the conventional practice to provide a telephone with a substantial length of cord so that the telephone may be carried about the room for the convenience of the user. Often, the cord becomes entangled on furniture and sometimes the cord is tripped upon by the user. Furthermore, the user of the telephone sometimes wants to jot or write down telephone numbers or other messages and it is not convenient to leave the telephone so that paper and pencil can be located elsewhere in the house.

Some attempts have been made to avoid these problems by providing a take-up mechanism for self-winding the telephone cord. Such devices are shown in U.S. letters Pat. Nos. 2,678,779 and 1,737,978. Also, other attempts have been made to show attachments for telephones which include a roll of paper and a writing surface such as those disclosed in U.S. Pat. Nos. 2,592,066 and 1,615,359. Although these devices have been successful for their intended purposes, they are separate devices and their structure and function has not been combined so as to provide a universal attachment or accessory for the telephone which will automatically coil the cord and provide writing paper and storage mechanism for holding a pen or pencil.

Therefore, a long-standing need has existed to provide a single accessory having mechanism for automatically reeling and coiling the telephone cord which is combined with a paper dispenser and pencil holder which further includes snap-lock attachment means for releasably connecting the accessory to a conventional telephone.

SUMMARY OF THE INVENTION

Accordingly, the above difficulties and problems encountered with prior art devices are obviated by the present invention which provides a housing having snap-lock means for detachably and releasably connecting with the case or housing of a conventional telephone. The accessory housing encloses a reel which is spring loaded so as to automatically coil a length of telephone cord about its core in such a manner that the cord may be let out or taken in at the will of the user. Furthermore, a paper dispensing means is provided which includes a roll of paper having a portion passing through a slot and extended over a writing or backing surface and which includes a holder for a pen or pencil. The holder of the pen or pencil forms an operable component of the snap-lock fastening means along with a removable portion of the accessory housing. The snap-lock means includes a pair of resilient members forming a yieldable restriction into which the telephone housing is placed whereby the constriction of the snap-lock element holds the accessory housing thereto.

Therefore, it is among the primary objects of the present invention to provide a novel telephone accessory having an automatic cord reeling mechanism in combination with a paper dispensing means.

Another object of the present invention is to provide an automatic cord reeler for a telephone cord which is encased in a housing having a snap-lock means for releasably holding the accessory to the telephone housing.

A further object of the present invention is to provide a novel accessory for a telephone having a paper dispenser and a telephone cord reeling device cooperatively held in a housing having snap-lock fastening components for releasably connecting the accessory to a conventional telephone housing.

Still a further object of the present invention is to provide a novel telephone accessory device having a combined paper dispenser and telephone cord reeling mechanism which is arranged in a single unitary assemblage having snap-lock means for detachably connecting with conventional housing of a telephone.

DESCRIPTION OF THE PREFERRED EMBODIMENT

Figure 1:
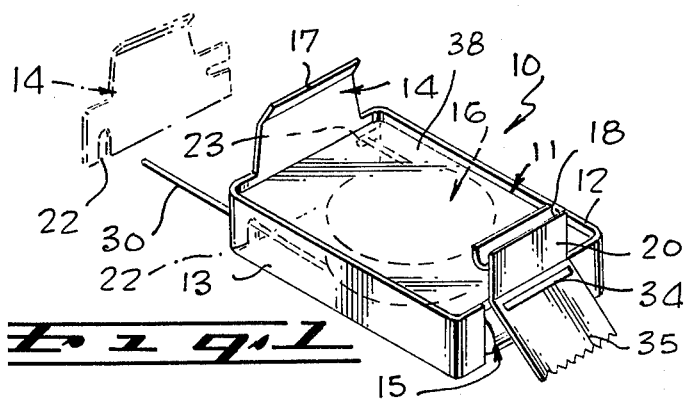
FIG. 1 is a front perspective view of the telephone accessory or attachment device incorporating the present invention.

Referring to FIG. 1, the novel accessory device of the present invention is indicated in the general direction of arrow 10 which includes a case or housing 11 having sidewalls 12 and 13 closed at one end by an end plate 14 and substantially closed at its other end by a paper dispensing means broadly indicated by the numeral 15. The accessory device includes the paper dispensing means 15 in combination with a cord coiling means indicated in general by the numeral 16. Both the paper dispensing means and the coil means for the cord are contained within the housing 11 so that an integral unit is produced. The attachment device is releasably connected to the housing of a conventional telephone by means of a snap-lock fastener composed of an inwardly projecting flange 17 carried on end plate 14 operating in combination with a rounded portion 18 that inwardly projects towards the flange 17 from an end plate 20. The rounded portion 18 constitutes a holder for a pen or pencil and the distance between the inwardly projecting flange 17 and the inwardly projecting element 18 is less than the overall dimension of the length of the conventional telephone housing so that a snap-lock attachment is produced. It is to be noted that the end piece 14 is detachably connected to the sidewall 13 and 12 so that the cord, indicated by numeral 30 may be accommodated through a slot 22 in the end plate. A slot 23 in the end plate accommodates passage of the cord from a take-up reel and coiling means 16 to the telephone per se.

Figure 2:
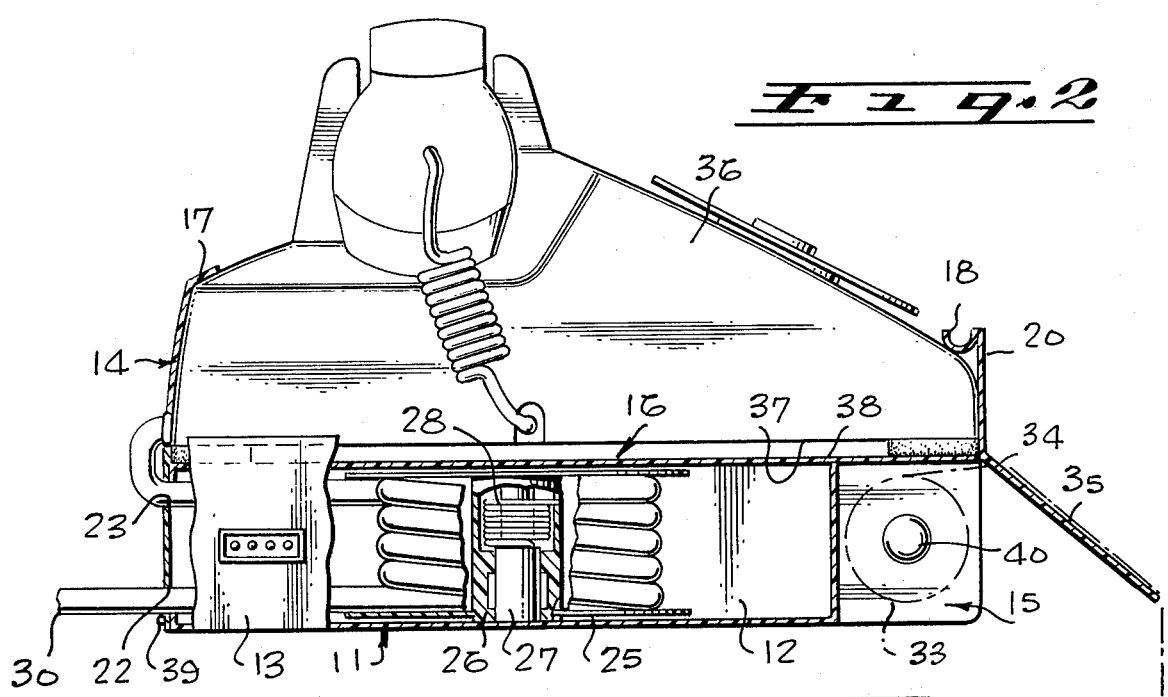
FIG. 2 is an enlarged longitutional cross-sectional view of the attachment device of the present invention snap-locked onto the bottom of the conventional telephone housing.
Figure 4:
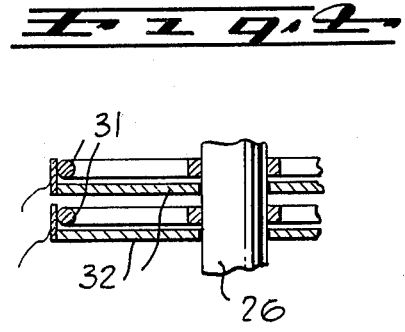
FIG. 4 is a diagramatic view of a suggested collector and brush arrangement incorporated into the reel mechanism of the invention.

Referring now in detail to FIG. 2, it can be seen that the coiling mechanism 16 comprises a reel 25 which is carried on a core 26 so as to be rotatably mounted on the housing 11. The reel 25 rotates about a fixed rod 27 carried on the housing and a resilient means such as spring 28 is operably connected between the rod and the reel core 26 so as to place a bias on the reel to draw the cord 30 about the core 26 of the reel. The cord, at least up to 40 feet in length, is illustrated wrapped about the core and one end of the cord passes through slot 22 while the other end of the cord passes through aperture or slot 23. If desired, a brush and collector system may be used as shown in FIG. 4 so as to eliminate static electricity which may interfere with the telephonic transmission through the cable 30. In this instance, with reference to FIG. 4, the collector rings are indicated by numeral 31 while the brushes are indicated by numeral 32.

Referring again to FIG. 2, the paper dispensing means includes a roll of paper 33 carried on the housing 11 between walls 13 and 12. A portion of the paper is fed through a slot 34 so that a length of the paper will lie across a working surface 35 which outwardly projects from the housing 11. The upright end piece 20 carries the pen holder 18 in such a manner that the underside of the holder snaps across the housing 36 of the telephone. The opposite end of the housing 11 is connected to the other end of the telephone case 36 by the projection 17 carried on end plate 14. FIG. 2 clearly shows that the dimensional distance between the projection 17 and the pencil holder 18 is less than the length of the housing across the bottom of the phone case 36. Therefore, a snap-lock arrangement or fastening means is provided by the projection 17 and 18. It is understood that the end plate 14 as well as the plate 20 is composed of a resilient material such as plastic or even metal so that it will spring to accommodate the snap-lock relationship.

Furthermore, it is to be noted in FIG. 2 that the bottom 37 of the telephone rests on a plate 38 carried on the housing 11. The reel mechanism 16 is disposed between the plate 38 and the bottom of the housing 11 and fasteners for accommodating the connection of plate 14 to the end of the housing 11 are identified by numeral 39.

Figure 3:
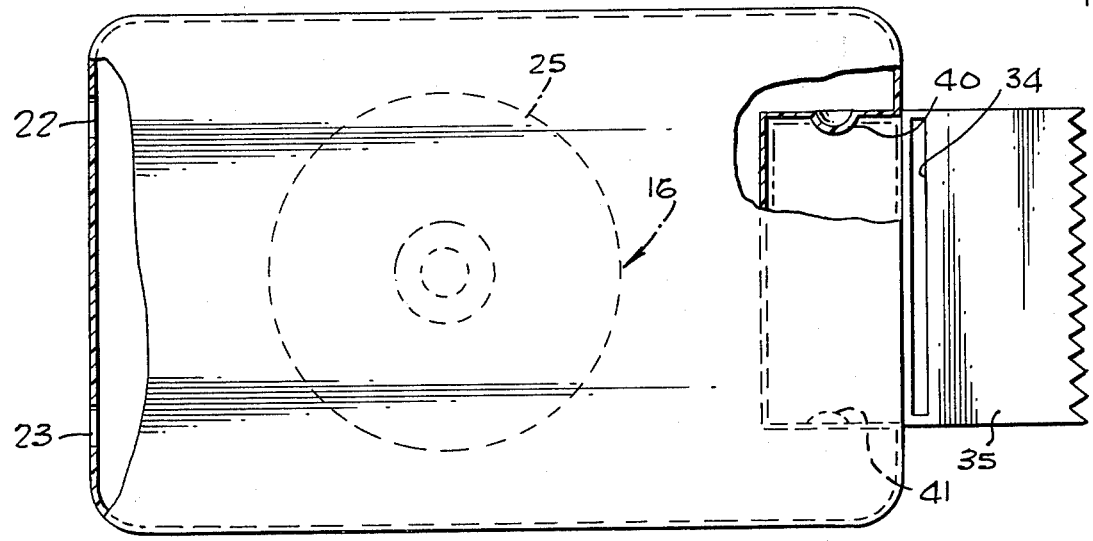
FIG. 3 is a bottom view of the attachment or accessory device shown in FIG. 2.

Referring now in detail to FIG. 3, it can be seen that the dispensing roll of paper 33 is carried between knobs 40 and 41 which operates as an axle about which the roll may rotate when the length of paper is pulled from the roller.

In view of the foregoing, it can be seen that the novel telephone accessory device of the present invention provides a single unitary structure carrying both the cord reeling mechanism and the paper dispensing mechanism and that these elements or components are carried on a case or housing which is snap-locked into position on the base of the telephone 36 for use. The snap-lock relationship makes the accessory a unitary feature of the telephone and may be carried around with the telephone without the undesired length of cable trailing behind.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A telephone accessory combination for coiling a length of telephone cord and for providing a note paper and writing implement holder comprising:
    a housing having an upper edge defining the entrance into an internal cavity;
    a reel rotatably carried on said housing within said cavity;
    spring means normally biasing said reel to coil said cord therearound;
    a writing panel carried on said housing;
    a supply of paper rotatably carried on said housing and within said cavity and having a length of paper extending across said writing panel;
    snap-lock fastener means detachably connecting said housing about its upper edge to a conventional telephone housing;
    an end piece defining one end of said housing;
    slots formed in said end piece for movably passing portions of said telephone cord; and
    said fastener means including inwardly projecting elements carried on said end piece and said writing panel opposing each other in resilient relationship so as to snap-lock about the opposite ends of said telephone housing.

2. The invention as defined in claim 1 including an up-standing plate carried on said writing panel having a U-shaped member carried thereon and said U-shaped member constituting a part of said snap-lock fastener means.

3. The invention as defined in claim 2 including sufficient storage area within said cavity to accommodate at least 40 feet of telephone cord about said reel.

4. The invention as defined in claim 3 wherein said end piece is detachably connectable to said housing so as to close one end of said housing cavity.

5. The invention as defined in claim 4 including an inwardly projecting flange carried on said end piece cooperating with said U-shaped member to snap-lock said telephone housing therebetween.

* * * * *